(12) United States Patent
Van Hoeckel et al.

(10) Patent No.: US 9,854,150 B2
(45) Date of Patent: Dec. 26, 2017

(54) AUTO-FOCUS CONTROL IN A CAMERA TO PREVENT OSCILLATION

(71) Applicant: BlackBerry Limited, Waterloo (CA)

(72) Inventors: Martin Frank Clayton Van Hoeckel, Waterloo (CA); Matthew Everitt Wakelin, Kitchener (CA); Mu-I Helton Chen, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 48 days.

(21) Appl. No.: 14/928,035

(22) Filed: Oct. 30, 2015

(65) Prior Publication Data
US 2017/0118395 A1    Apr. 27, 2017

Related U.S. Application Data

(60) Provisional application No. 62/247,163, filed on Oct. 27, 2015.

(51) Int. Cl.
*H04N 5/232* (2006.01)

(52) U.S. Cl.
CPC ............................. *H04N 5/23212* (2013.01)

(58) Field of Classification Search
CPC ................................................ H04N 5/23212
See application file for complete search history.

(56) References Cited

U.S. PATENT DOCUMENTS

| 5,597,999 | A | 1/1997 | Kinba et al. | |
| 6,818,875 | B1* | 11/2004 | Suzuki | G02B 7/28 |
| | | | | 250/201.2 |
| 7,728,903 | B2 | 6/2010 | Ohnishi | |
| 2008/0036902 | A1* | 2/2008 | Tanaka | G02B 7/08 |
| | | | | 348/353 |
| 2014/0071303 | A1* | 3/2014 | Hasegawa | H04N 5/23212 |
| | | | | 348/208.11 |
| 2015/0085178 | A1* | 3/2015 | Aoki | H04N 5/23212 |
| | | | | 348/349 |

FOREIGN PATENT DOCUMENTS

| GB | 2258109 | 1/1993 |
| KR | 20160038409 | 4/2016 |

OTHER PUBLICATIONS

EPO, Extended European Search Report relating to EP application No. 16188911.8. dated Jan. 4, 2017.

* cited by examiner

*Primary Examiner* — Padma Haliyur
(74) *Attorney, Agent, or Firm* — Rowand LLP

(57) ABSTRACT

A method and device for auto-focus control in an imaging device is provided. The imaging device includes a lens. In one aspect, a method includes: obtaining a first lens position phase difference; after obtaining the first lens position phase difference, detecting lens movement; obtaining a second lens position phase difference; comparing the second lens position phase difference to the first lens position phase difference to determine whether the second lens position phase difference is greater than the first lens position phase difference; and in response to determining that the second lens position phase difference is greater than the first lens position phase difference, determining autofocus settings by a contrast detection method.

20 Claims, 8 Drawing Sheets

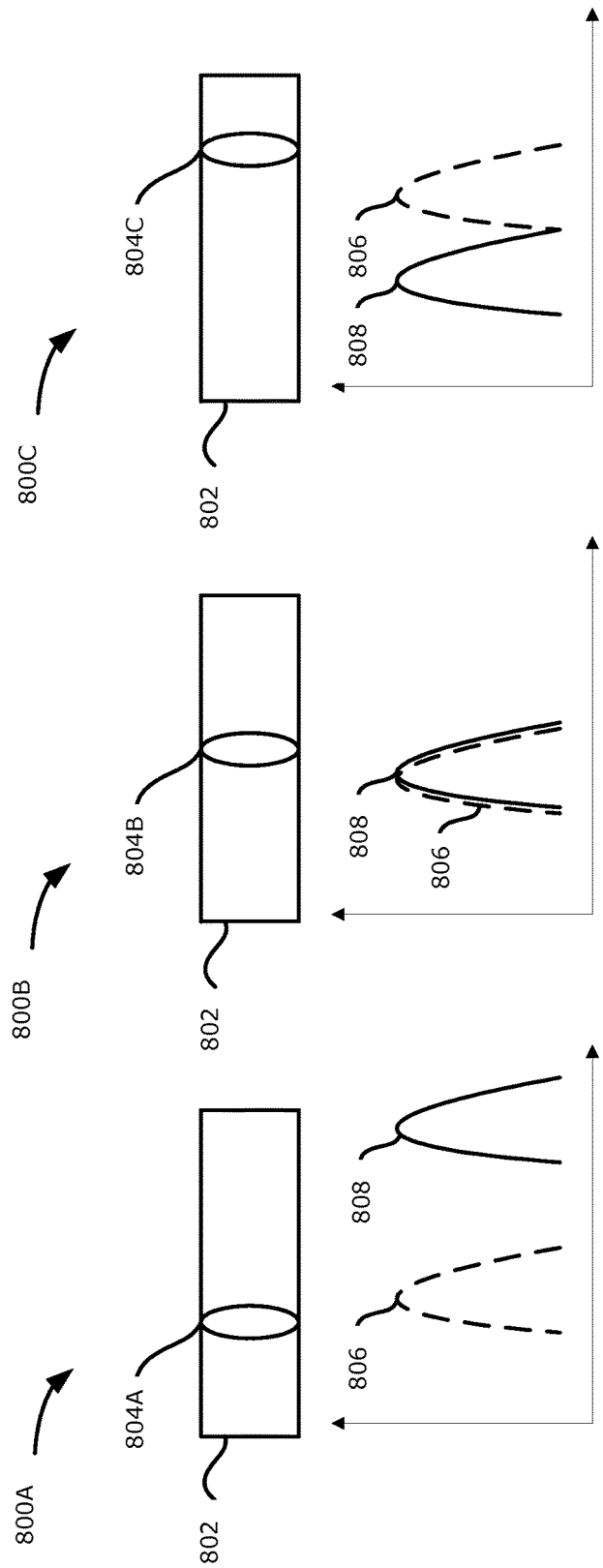

AUTO-FOCUS CONTROL IN A CAMERA TO PREVENT OSCILLATION

The present disclosure relates generally to electronic devices having cameras and, more particularly, to methods and devices for auto-focus control in cameras.

BACKGROUND

Electronic devices having cameras are often equipped with an image sensor and one or more lenses. A lens may be moved towards or away from the image sensor to focus an object or a scene onto the image sensor. Digital cameras often include an autofocus mechanism for determining movement of a lens relative to the image sensor. Autofocus mechanisms include contrast detect autofocus and phase detect autofocus.

Contrast detection autofocus mechanisms are generally achieved by measuring contrast within a sensor field. As the intensity difference between adjacent pixels increase, the focus of the image increases. The lens may be adjusted until a maximum contrast is detected. Contrast detection uses a gradient of pixel values from the sensor's view of a scene to judge mis-focus; however, contrast detection requires repeated measurements as the lens moves and scans a focus range.

Phase detection autofocus mechanisms are generally achieved by comparing a disparity between views of a scene feature captured through a left and a right side of a lens to judge mis-focus. Phase detection autofocus systems generally include separator lenses and at least one pair of focus sensors. Although light arrives at each focus sensor in a focus sensor pair from opposite sides of a lens, the image reaching each focus sensor is the same part of the object or subject being photographed. Because of the distance between the left and right sides of the lens, each focus pixel in the focus pixel pair may see a slightly different view of a subject. To achieve focusing, the image reaching each focus pixel in the focus pixel pair is captured and compared. A phase difference between the captured images is determined and the lens may be shifted a distance corresponding to the phase difference. However, due to the finite size of focus sensor in a focus sensor pair, characteristics of a scene or object being photographed can make it difficult to arrive at a correct focus.

BRIEF DESCRIPTION OF THE DRAWINGS

Reference will now be made, by way of example, to the accompanying drawings which show example embodiments of the present application, and in which:

FIGS. 8A, 8B and 8C illustrate several signals of images captured on focus sensors and relative to camera lens positions.

Like reference numerals are used in the drawings to denote like elements and features.

DETAILED DESCRIPTION OF EXAMPLE EMBODIMENTS

Figure 2:
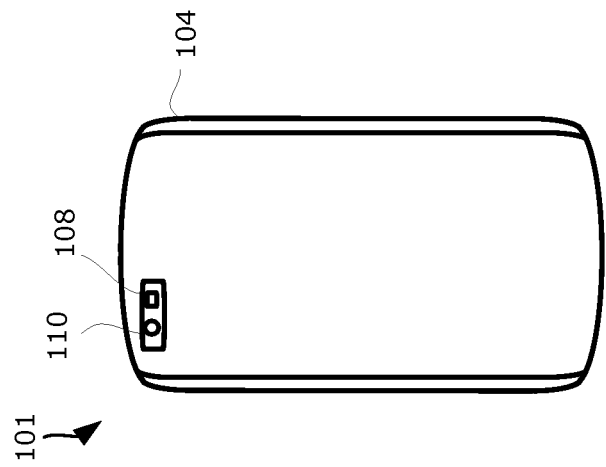
FIG. 2 is a rear view of the example electronic device of FIG. 1.

In one example aspect, the present disclosure describes a method for auto-focus oscillation control in an imaging device. The imaging device may have a lens. The method includes: obtaining a first lens position phase difference; after obtaining the first lens position phase difference, detecting lens movement, the lens movement including transitioning the lens from a first position to a second position; obtaining a second lens position phase difference; comparing the second lens position phase difference to the first lens position phase difference to determine whether the second lens position phase difference is greater than the first lens position phase difference; and in response to determining that the second lens position phase difference is greater than the first lens position phase difference, determining autofocus settings by a contrast detection method.

In another aspect, an electronic device is described. The electronic device includes a lens and an image sensor. The electronic device also includes a processor coupled to the image sensor and the lens. The processor is configured to: obtain a first lens position phase difference; after obtaining the first lens position phase difference, detect lens movement, the lens movement including transition of the lens from a first position to a second position; obtain a second lens position phase difference; compare the second lens position phase difference to the first lens position phase difference to determine whether the second lens position phase difference is greater than the first lens position phase difference; and in response to determining that the second lens position phase difference is greater than the first lens position phase difference, determine autofocus settings by a contrast detection method.

In yet a further aspect, a non-transitory computer-readable storage medium comprising processor-executable instructions is described. The instructions, when executed by a processor of the electronic device, causes the electronic device to: obtain a first lens position phase difference; after obtaining the first lens position phase difference, detect lens movement, the lens movement including transitioning a lens from a first position to a second position; obtain a second lens position phase difference; compare the second lens position phase difference to the first lens position phase difference to determine whether the second lens position phase difference is greater than the first lens position phase difference; and in response to determining that the second lens position phase difference is greater than the first lens position phase difference, determine autofocus settings by a contrast detection method.

In yet a further aspect, the present disclosure describes non-transitory computer-readable media storing computer-executable program instructions which, when executed, configure a processor to perform the described methods.

Other aspects and features of the present application will be understood by those of ordinary skill in the art from a review of the following description of examples in conjunction with the accompanying figures.

In the present application, the term "and/or" is intended to cover all possible combination and sub-combinations of the listed elements, including any one of the listed elements alone, any sub-combination or all of the elements, and without necessarily excluding additional elements.

In the present application, the term "a processor" is intended to include both a single processor and also a plurality of processors coupled to one another which distribute operations among the processors.

Figure 1:
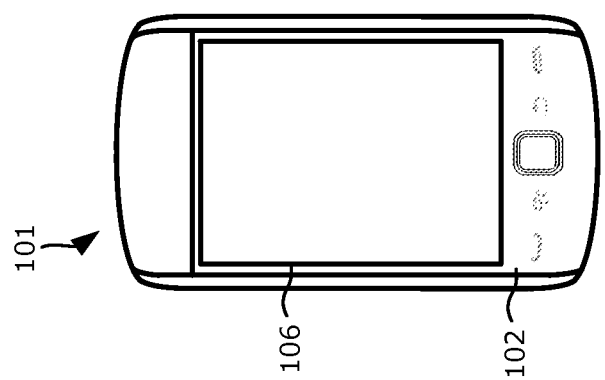
FIG. 1 is a front view of an example electronic device in accordance with example embodiments of the present disclosure.

Reference will now be made to FIGS. 1 and 2, which illustrate an example electronic device having a camera and/or imaging device. The electronic device 101 that is equipped with the camera may take a variety of forms. In the illustrated example, the electronic device 101 is a smartphone. In other embodiments, the electronic device 101 may be a tablet computer, a stand-alone camera (i.e., a digital camera), a personal digital assistant (PDA), a wearable computer such as a watch or an electronic device of another type.

FIG. 1 illustrates a front side 102 of the electronic device 101. FIG. 2 illustrates a rear side 104 of the electronic device 101. The example electronic device 101 includes a housing which houses at least some of the components of the electronic device 201. At least some of these components will be described below with reference to FIG. 3.

In the example embodiment illustrated, the electronic device 101 includes a display 106, which may be a touchscreen display which acts as both an input interface and an output interface. The display 106 is disposed within the electronic device 101 so that it is viewable on a front side 102 of the electronic device 101.

In an operating mode, the display 106 acts as a viewfinder for a camera, displaying, in real time or near real time, images defined in electronic signals received from a camera. The viewfinder allows a user to preview an image.

Referring now to FIG. 2, a rear side 104 of the electronic device 101 is shown. The example electronic device includes a camera 108 which is, in the example, provided on a rear side 104 of the electronic device 101. In this configuration, the camera 108 may be referred to as a rear-facing camera.

The methods and systems described herein can be used with both front facing cameras and rear facing cameras. Thus, while the example embodiment includes a single camera 108, which is rear-facing, the electronic device 101 may, in another embodiment, include one or more front facing cameras instead of, or in addition to, the rear facing camera. A front facing camera is one that is located on the front side 102 (FIG. 1) of the electronic device 101. A front facing camera is oriented to capture images of subjects which are located in front of and/or surrounding the front side 102 of the electronic device 101.

The electronic device 201 includes a flash 110 which is associated with the camera 108. The flash 110 may be one or more light emitting diode (LED), a tube substantially filled with xenon gas, or any other flash device. The flash 110 emits electromagnetic radiation when the flash 110 is triggered. More particularly, the flash 110 may be used to generate a brief bright light which facilitates picture-taking in low light conditions. The flash 110 may be configured to generate at least two types of flashes: a pre-flash and a regular flash. The pre-flash may be a flash that is generated prior to the regular flash.

One or more input interfaces may be provided on the electronic device 101 to allow a user to input a picture request. A picture request is a command instructing the electronic device 101 to acquire an image with a camera 108 associated with the electronic device 101. The input interface may, for example, be a physical or virtual button or key. In some embodiments, a user may also use an input interface to configure settings that will be used when acquiring the image. For example, an input interface may allow a user to set a flash mode for the electronic device 101. The flash mode may be set to a "flash off" mode in which the flash is not triggered before acquiring an image, a "flash on" mode in which the flash is triggered before acquiring an image, or an "auto flash" mode in which the electronic device 101 automatically determines whether to trigger the flash. When the auto flash mode is selected, the electronic device 101 may determine whether low-light conditions exist and, if so, may enable the flash.

Figure 3:
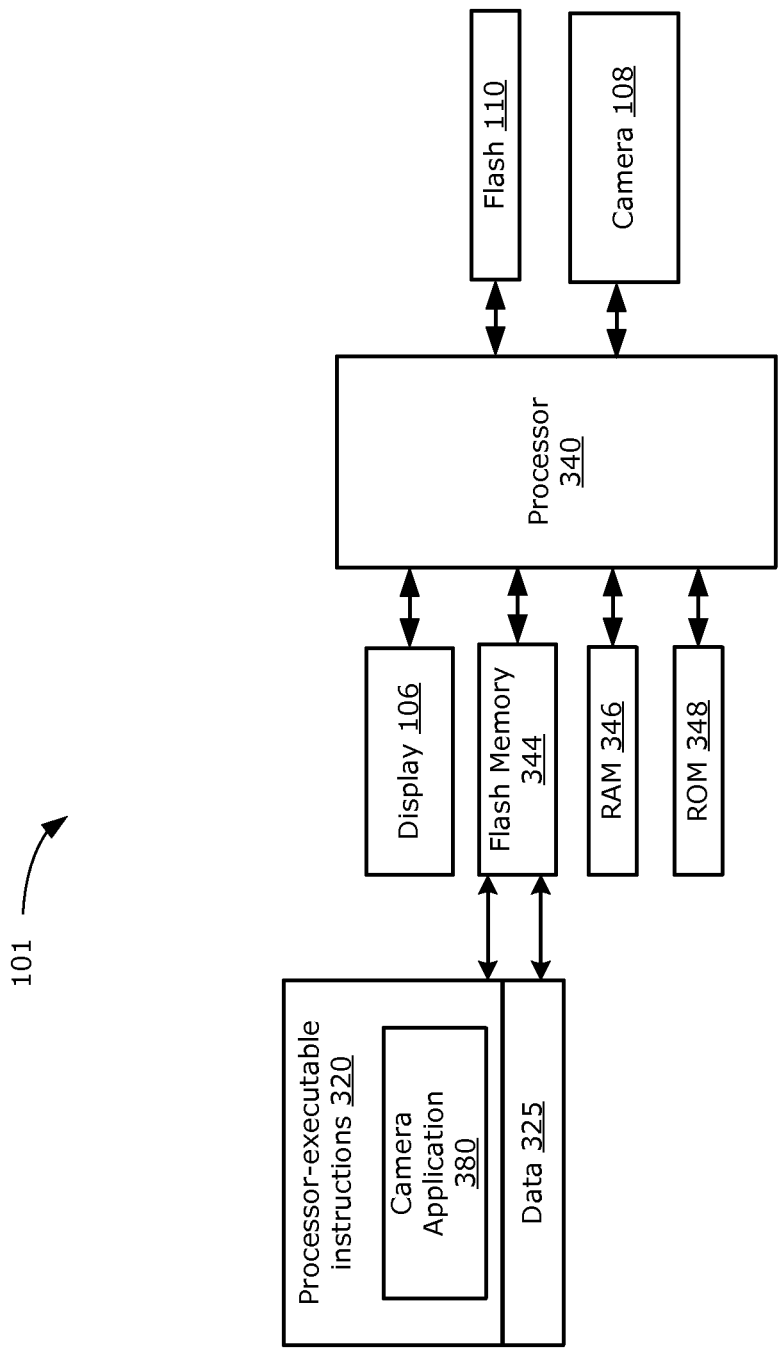
FIG. 3 is a block diagram illustrating an example electronic device in accordance with example embodiments of the present disclosure.

Reference is now made to FIG. 3 which illustrates a block diagram of components of the example electronic device 101.

The electronic device 101 includes a controller including at least one processor 340 (such as a microprocessor) which controls the overall operation of the electronic device 201. The processor 340 may be communicatively coupled with device subsystems such as one or more output interfaces (such as a display 106, a flash 110 and/or a speaker), one or more input interfaces (such as a camera 108, control buttons (not shown), a touch-sensitive overlay (not shown) associated with a touchscreen display and/or other input interfaces), memory (such as flash memory 344, random access memory (RAM) 346, read only memory (ROM) 348, etc.).

The electronic device 101 may include a camera 108 capable of capturing camera data, such as images, in the form of still photo and/or motion data. The camera data may be generated in the form of an electronic signal which is produced by an image sensor associated with the camera 108. In some embodiments, a camera lens may focus a scene or object being photographed onto the image sensor. The camera lens may be positioned at various distances from the image sensor to focus the scene or object onto the image sensor. In some embodiments, the distance between the camera lens and the image sensor may be determined by various autofocus mechanisms.

The camera 108 may also have optoelectronics, including separator lenses and a focus sensor. The camera focus sensor may include one or more focus sensor pairs that may be used for phase detection autofocus (PDAF). Each focus sensor pair may include a first focus sensor and a second focus sensor. Generally, the separator lenses may direct light coming from opposite sides of a camera lens towards the focus sensor pair. The processor 340 may determine a phase difference between the two images and the processor 340 may cause the camera lens to move towards or away from the camera image sensor based on the determined phase difference.

In some embodiments, each of the first focus sensor and the second focus sensor may be a pixel detector array. For example, the pixel detector array may be a few pixels wide and one or two pixels in height. The relative positions of images on the respective pixel detector arrays may be determined by a cross-correlation algorithm on the luminance patterns reported by the pixel detector arrays (e.g., the first focus sensor and the second focus sensor). As described, the processor 340 may determine a phase difference and may cause the camera lens to move towards or away from the image sensor based on the determined phase difference.

In some embodiments, the camera image sensor is separate from the camera focus sensor. Mirrors within a camera may be used to redirect light rays to both the image sensor and the focus sensor. In some embodiments, one or more focus sensor pairs may be integrated on the camera image sensor. That is, the one or more focus sensor pairs may be integrated on the camera image sensor as dedicated focus sensor pixels alongside image sensor pixels of the camera image sensor.

Reference will now be made to FIGS. 8A, 8B and 8C which illustrate signals from corresponding focus sensors in a focus sensor pair. Referring to FIG. 8A, a camera lens barrel 802 is shown including a lens. The lens is at a first lens position 804A within the camera lens barrel 802. Images captured by each focus sensor in a focus sensor pair may be shown as signals 806, 808. For example, the first signal 806 may represent a luminance pattern captured by a first focus sensor. The first focus sensor may receive light coming from a left side of the camera lens. The second signal 808 may, for example, represent a luminance pattern captured by a second focus sensor. The second focus sensor may receive light coming from a right side of the camera lens. As will be described with reference to FIG. 5, the processor 340 may determine a phase difference based on the signals 806, 808.

Referring now to FIG. 8B, the lens is in a second lens position 804B within the camera lens barrel 802. That is, the processor 340 may have configured the lens to move from a first lens position 804A to a second lens position 804B. Accordingly, the signals 806, 808 are shown to nearly overlap. The phase difference between the image captured by the first focus sensor and the image captured by the second focus sensor in the focus sensor pair may be very small. In some embodiments, the processor 340 may determine whether the phase difference is less than a focus threshold and, if the phase difference is less than the focus threshold, the processor 340 may determine that the scene or object being photographed is correctly focused onto the camera image sensor.

Referring now to FIG. 8C, the processor 340 may configure the lens to further move from the second lens position 804B to a third lens position 804C. The signals 806, 808 may further separate. That is, the phase difference between the image captured by the first focus sensor and the image captured by the second focus sensor in the focus sensor pair may increase.

As shown in FIGS. 8A, 8B and 8C, the phase difference between images captured at the focus sensor pair, illustrated as signals 806, 808, may be correlated to the position of the lens within the camera lens barrel. When the phase difference between the images captured at the focus sensors is zero or very small, the scene or object being photographed may be in focus on the camera 108 image sensor. As will be described with reference to FIG. 4A, the processor 340 may determine a distance that the lens 804 may move within the camera lens barrel 802 to decrease the phase difference between the respective images captured at the focus sensor pair.

Referring again to FIG. 3, the electronic device 101 stores data 325 in an erasable persistent memory, which in one example embodiment is the flash memory 344. In some embodiments, the data 325 includes images generated by the camera 108. In some embodiments, the data 325 may include PDAF defocus values or other data generated by focus sensors in the camera 108.

The processor 340 operates under stored program control and executes processor-executable instructions 320 stored in memory such as persistent memory, for example, in the flash memory 344.

The processor-executable instructions 320 or parts thereof may be temporarily loaded into volatile memory such as the RAM 346. The RAM 346 may be used for storing runtime data variables and other types of data or information, as will be apparent. Although specific functions are described for various types of memory, this is merely one example. It will be appreciated that a different assignment of functions to types of memory could also be used.

The processor 340 may be communicatively coupled to the camera 108 to allow the processor 340 to receive electronic signals representing camera data from the camera 108. The processor 340 may also be communicatively coupled to the flash 110 to allow the processor 340 to control the flash 110.

In at least some embodiments, the processor-executable instructions may include one or more camera applications 380 or software modules which are configured to control the camera 108 and the flash 110. The camera application 380 may, for example, be configured to provide a viewfinder on the display 106 by displaying, in real time or near real time, images defined in the electronic signals received from the camera 108. The camera application 380 may be configured to store the images or videos to memory, for example the flash memory 344. The images may be stored in various formats including JPEG, RAW, BMP, etc. The camera application 380 may be configured to receive data from one or more image and/or focus sensors of the camera 108 for use with autofocus methods as described herein.

The camera application 380 may, in various embodiments, determine and/or control any one or more of a number of various camera related features, options or settings including, for example, the flash 110, a digital zoom feature (which may crop an image to a centered area with the same aspect ratio as the original), an image stabilization feature, a shutter speed, a camera lens aperture, a focal length, high dynamic range settings such as a long exposure time and a short exposure time, a white balance setting and other camera configuration settings. In some embodiments, the focal length may be adjusted by lens movement. Lens movement contributes to focusing a scene or object onto an image sensor. At least some of the features may be automatically determined by the camera application 380. That is, at least some of these settings may be determined without direct user input setting such settings.

While the embodiment discussed above includes a processor 340 coupled with a camera application 380 which collectively act as an image signal processor to provide image related functions, in other example embodiments (not shown), another processor such as a dedicated image signal processor, may provide some or all of these functions. That is, an image signal processor may be configured to perform the functions of the camera application 380 or a portion thereof.

For example, the camera 108 may be a digital camera provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as a Serial Peripheral Interface (SPI) or Inter-Integrated Circuit (I2C) interface for connecting to a printed circuit board (PCB) of the electronic device 101. The controller provided on the IC may be configured to perform some or all of the features of the methods described herein.

Furthermore, while the camera application 380 has been illustrated as a stand-alone application, in at least some example embodiments, the functions of the camera application 380 may be provided by a plurality of software modules. In at least some example embodiments, the software modules may be divided among multiple applications.

Further, while the memory which stores the processor-executable instructions 320 has been illustrated using a block that is separate from the processor 340, in practice, the memory storing the processor-executable instructions 320 may be provided on-board the processor 340. That is, the processor 340 may include internal memory and the processor-executable instructions may be provided on the internal memory.

The electronic device 101 may include other components apart from those illustrated in FIG. 3. By way of example, the electronic device 101 may include or be connected to a power source, such as a battery, which provides power to various components of the electronic device.

In some embodiments, the electronic device 101 having the camera 108 may utilize the phase detection autofocus mechanism to determine lens movement for focusing a scene or object being photographed onto the camera image sensor. In some embodiments, a scene or object being photographed may contain high frequency details or strong lines. Examples of scenes or objects having high frequency details or strong lines include an automobile engine grille with repeating horizontal structures, a set of horizontal or vertical blinds or a metal fence having a series of parallel wires. In some examples, although a camera lens may be positioned relative to a camera image sensor to optimally focus an overall scene or object onto a camera image sensor, high frequency details or strong lines of the scene or object being photographed may intersect a focus sensor pair. For example, the focus sensor pair may be of finite size and the positioning of the high frequency details or strong lines of the scene or object may happen to intersect the focus sensor pair.

Oscillation can occur when phase detection autofocus is used with scenes having such high frequency details or strong lines. That is, the high frequency components of an image may cause problems for a PDAF sensor due, at least in part, to the separation of left and right views. By way of example, when using the phase detection autofocus mechanism and when high frequency details or strong lines intersect the focus sensors of a focus sensor pair, the processor 340 may determine that a large phase difference exists between a signal from a first focus sensor and a signal from a second focus sensor. As described in accordance with the phase detection autofocus mechanism, the processor 340 may then cause lens movement in a direction to attempt to cause a decrease in the phase difference between the signal from the first focus sensor and the signal from the second focus sensor.

Continuing with the oscillation example, once the processor 340 causes lens movement in a direction away from the optimal lens position for focusing the overall scene or object onto the image sensor, the processor 340 may subsequently evaluate signals 806, 808 from the first focus sensor and the second focus sensor and determine that the phase difference between signal 806 from the first focus sensor and the signal 808 from the second focus sensor indicates that the scene or object being photographed remains not optimally focused onto the camera image sensor. For example, the signals 806, 808 may be those as illustrated in FIG. 8A. The processor 340 may then cause further lens movement in a direction towards the optimal lens position. When the lens is positioned again in the more optimal lens position for focusing the overall scene or object, high frequency details or strong lines may, again, intersect a focus sensor pair and the processor 340 may, again, cause lens movement in a direction away from the optimal lens position. Accordingly, due to the high frequency image, the lens position may oscillate between a more optimal lens position, that may optimally focus the overall scene or object onto the camera image sensor, and a less-optimal lens position, that causes the scene or object to be incorrectly focused onto the camera image sensor. A method for auto-focus oscillation control may, therefore, be useful to prevent the oscillation described in the above example.

Figure 4A:
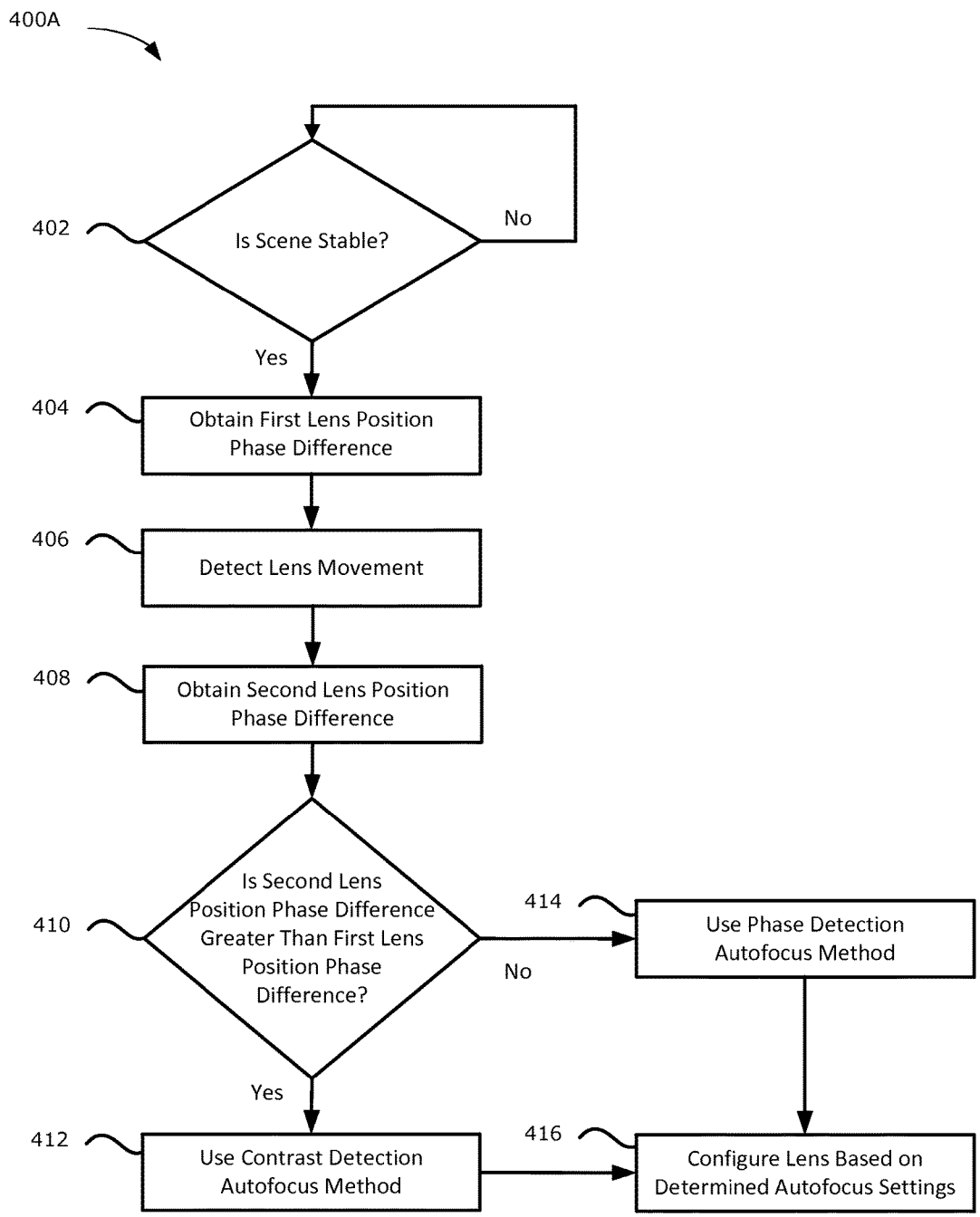
FIG. 4A is a flowchart illustrating an example method for auto-focus oscillation control in an imaging device.

Reference is now made to FIG. 4A which illustrates an example method 400A for auto-focus oscillation control in an imaging device. The method 400A may be performed by an electronic device 101 of the type described above with reference to FIGS. 1 to 3 or a variation of such electronic devices. For example, in at least some embodiments, processor-executable instructions 320, such as a camera application 380, may configure a processor 340 of the electronic device 101 to perform the method 400A.

The method 400A may be based on both a phase detection auto-focus mechanism and a contrast detection auto-focus mechanism. For example, as will be apparent, phase detection autofocus may be used to initially attempt to configure one or more lenses of the camera 108 to accurately focus a scene or object on an image sensor of the camera 108. Further, the contrast detection mechanism may also be used to configure the one or more lenses of the camera 108 to accurately focus a scene or object on an image sensor of the camera 108 if the processor 340 determines that an autofocus oscillation condition may occur or is occurring.

At 402, the processor 340 determines whether the scene being captured or photographed is stable. In some embodiments, the processor 340 may determine that a scene is stable by retrieving pixel data from an image sensor of the camera 108. For example, the processor 340 may determine whether luminance data of each pixel is changing. In some embodiments, the processor 340 may determine whether a scene is stable by retrieving data from sensors for detecting movement of the electronic device 101. For example, sensors for detecting movement of the electronic device 101 may include gyroscopes or accelerometers. In some embodiments, if data from sensors for detecting movement indicates that the electronic device 101 is moving, the processor 340 may determine that the scene being photographed is not stable. If the data from the sensors for detecting movement indicates that the electronic device 101 is not moving, however, the processor 340 may determine that the scene may or may not be stable. The processor 340 may examine luminance data to determine whether the scene is stable. That is, in some embodiments, the processor may determine whether a scene is stable based on a combination of pixel data and data from movement sensors. If the processor 340 determines that the scene to be captured is not stable, the processor 340 continues to monitor for the presence of a stable scene.

When the processor 340 determines that the scene to be captured is stable, at 404, the processor 340 obtains a first lens position phase difference. For example, referring again to FIG. 8A, the first lens position phase difference may be the phase difference between signals 806, 808 captured on a focus sensor pair.

Figure 5:
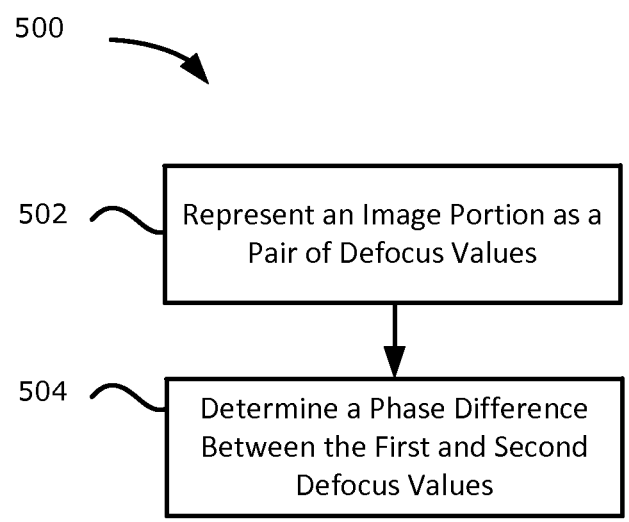
FIG. 5 is a flowchart illustrating an example method of determining a lens position phase difference.

Simultaneous reference will now be made to FIG. 5 and FIG. 8. FIG. 5 illustrates an example method 500 of determining a lens position phase difference. The method 500 may be performed at 404 of the method 400A in FIG. 4A.

At 502, the processor 340 may represent an image portion as a pair of defocus values. A pair of defocus values may include a first defocus value and a second defocus value. For example, the defocus values may be a numerical representation based on the signals 806, 808. Similar to the description of FIGS. 8A, 8B, 8C, the first defocus value may represent a scene feature captured through a left side of a lens and focused onto a first focus sensor of a focus sensor pair. The second defocus value may represent a scene feature captured through a right side of a lens and focused onto a second focus sensor of a focus sensor pair. In some embodiments, defocus values may represent the extent that an image forming plane, such as at the camera image sensor, is offset from the estimated focal plane of the scene or object being photographed as provided by the current camera lens position. That is, defocus values may represent a relative positional offset quantity or distance between the image sensor plane and the image plane provided by the current camera lens position.

At 504, the processor 340 may analyze the image data captured at the first focus sensor and at the second focus sensor and determine how much the image captured at the first focus sensor is shifted relative to the image captured at the second focus sensor. That is, the processor 340 may determine a phase difference between the first focus value and the second focus value. In some embodiments, the processor 340 may determine the phase difference using a cross-correlation or auto-correlation algorithm. For example, the phase difference may provide the processor 340 information for determining a magnitude and direction of lens movement necessary to bring the scene or object being photographed into focus on the camera image sensor. Based, at least, on the determined phase difference, the processor 340 may cause a camera 108 lens to be adjusted. The processor 340 may cause the camera lens to be adjusted towards or away from the camera image sensor by a magnitude.

Referring again to FIG. 4A, at 406, the processor 340 may detect lens movement. In some embodiments, as described, the detected lens movement may be based on the determined phase difference according to the phase detection autofocus mechanism. For example, the processor 340 may cause the camera lens to be adjusted towards or away from the camera image sensor to attempt to lessen or eliminate the phase difference between the first defocus value and the second defocus value.

At 408, the processor 340 obtains a second lens position phase difference. In some embodiments, similar to obtaining the first lens position phase difference at 404, the processor 340 may obtain the second lens position phase difference in accordance with the method 500 of FIG. 5.

At 410, the processor 340 may compare the second lens position phase difference, obtained at 408, and the first lens position phase difference, obtained at 404. If the second lens position better focuses the scene or object onto the camera image sensor, the second lens position phase difference is expected to be less than the first lens position phase difference.

At 410, if the processor 340 determines that the second lens position phase difference is greater than the first lens position phase difference, the processor 340 may identify an autofocus oscillation condition. Thus, if the processor 340 determines that the second lens position phase difference is greater than the first lens position phase difference, the processor 340 may switch, at 412, from using the phase detection autofocus mechanism to using a contrast detection autofocus mechanism. At 416, the processor 340 may configure the lens based on determined autofocus settings. That is, if the processor 340 determines that the second lens position phase difference is greater than the first lens position phase difference, the processor may determine autofocus settings by the contrast detection method and configure the lens based on the determined autofocus settings. For example, the processor 340 may configure the lens by causing lens movement towards or away from the camera image sensor. With the particular scene being photographed, the processor 340 may avoid an autofocus oscillation condition.

In some embodiments, the phase difference between a first signal 806 and a second signal 808 may converge without the phase difference changing sign. That is, the phase difference between the first signal 806 and the second signal 808 remains a positive value until the phase difference converges to zero or near-zero.

In some embodiments, the phase difference between the first signal 806 and the second signal 808 may converge with the phase difference changing signs. For example, the phase difference illustrated in FIG. 8A may be a positive value. The processor 340 may cause the lens to move to another position and the phase difference may be a negative value. That is, the first signal 806 and the second signal 808 may transition from what is illustrated in FIG. 8A to what is illustrated in FIG. 8C. In some embodiments, however, the processor 340 may only consider whether the magnitude of the phase difference is converging.

At 410, if the processor 340 determines that the second lens position phase difference is not greater than the first lens position phase difference, the processor 340 may determine that lens movements may be causing lens position phase difference values to converge. In some embodiments, at 410, the processor 340 may determine whether the second lens position phase difference is equal to or less than the first lens position phase difference. If the processor 340 determines that the second lens position phase difference is equal to or less than the first lens position phase difference, the processor 340 may determine autofocus settings by phase detection autofocus.

When lens position phase difference values converge, the lens movements cause the scene or object being photographed to be better focused. At 414, the processor 340 may determine that the phase detection autofocus mechanism is correctly focusing the scene and may not switch to the contrast detection autofocus mechanism. At 416, the processor 340 may configure the lens based on determined autofocus settings. That is, if the processor 340 determines that the second lens position phase difference, for example, is equal to or less than the first lens position phase difference, the processor 340 may determine autofocus settings by the phase detection method and configure the lens based on the determined autofocus settings.

In some embodiments, the presence of a stable scene may be a pre-condition or trigger for the processor 340, at 410, to determine whether the second lens position phase difference is greater than the first lens position phase difference. For example, for the comparison of the second lens position phase difference and the first lens position phase difference to be useful, the phase difference from the respective lens positions must be of the same scene, or of substantially the same scene. That is, if the second lens position phase difference were calculated from a scene that was different than the first lens position phase difference and if the second lens position phase difference was greater than the first lens position phase difference, the processor 340 would be uncertain whether the results were due to an autofocus oscillation condition or whether the results were due to the change in scene being photographed.

Figure 4B:
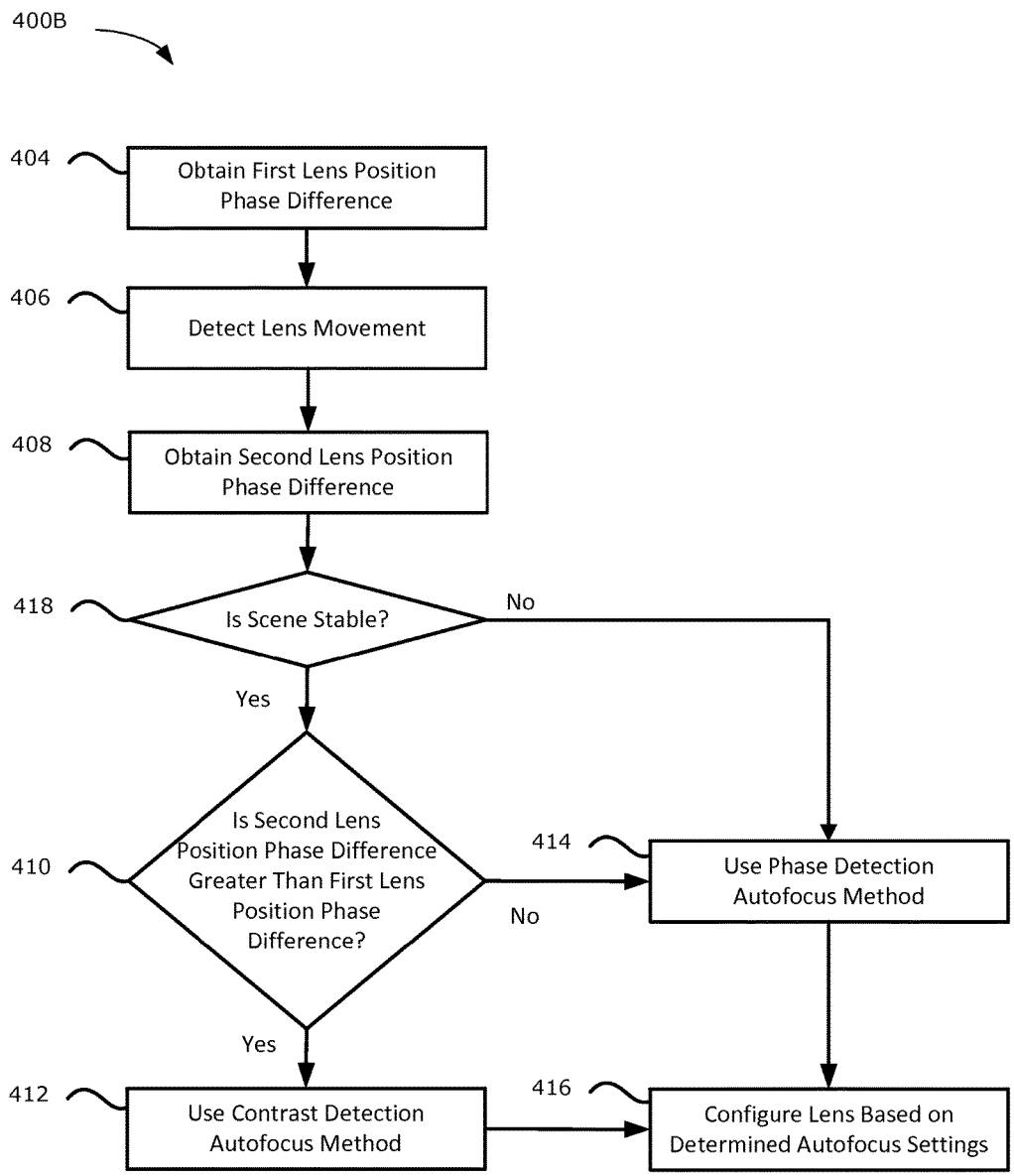
FIG. 4B is a flowchart illustrating an example method for auto-focus oscillation control in an imaging device.

Accordingly, reference will now be made to FIG. 4B which illustrates an example method 400B for auto-focus oscillation control in an imaging device. The method 400B at 404, 406, 408, 410, 412, 414 and 416 correspond to those of method 400A at 404, 406, 408, 410, 412, 414, 416, respectively. FIG. 4B corresponds to FIG. 4A but with a variation on when the processor 340 may determine whether the scene being captured or photographed is stable. That is, in FIG. 4B, the processor 340 may determine whether the scene being captured or photographed is stable alongside when the processor 340 may determine whether the second lens position phase difference is greater than the first lens position phase difference.

As will be described, in some embodiments, the processor 340 may, at 418, determine whether the scene is stable. That is, the processor 340 determines, at 418, whether the scene is stable prior to determining, at 410, whether the second lens position phase difference is greater than the first lens position phase difference. In some embodiments, the processor 340 may determine, at 410, whether the second lens position phase difference is greater than the first lens position phase difference prior to determining whether the scene is stable. That is, in some embodiments, determining autofocus settings by the contrast detection method is further in response to detecting a stable scene.

As will be apparent, if the scene is stable and the lens position phase difference data is not converging, the processor 340 may identify an autofocus oscillation condition and utilize contrast detection autofocus. If the scene is stable and the lens position phase difference data is converging, the processor 340 may identify that an autofocus oscillation condition may not be occurring and utilize phase detection autofocus to focus the scene onto the camera image sensor.

Further, if the scene is unstable and the lens position phase difference data is not converging, as described, the processor 340 would not know whether the non-converging lens position phase difference data were due to an unstable scene (e.g., change in scene being photographed) or to an autofocus oscillation condition. Similarly, if the scene is unstable and the lens position phase difference data appears to be converging, the processor 340 still could not determine whether the converging lens position phase difference data would be accurate (e.g., by chance that successive lens position phase difference data from an unstable scene were converging). Accordingly, in some embodiments, the processor 340 may determine whether the scene is stable prior to determining whether the lens position phase difference data is converging, and in some embodiments, the processor 340 may determine whether the lens position phase difference data is converging prior to determining whether the scene is stable.

For example, referring to FIG. 4B, at 418, the processor 340 may determine whether the scene is stable. If, at 418, the scene is stable, at 410, the processor 340 may determine whether the second lens position phase difference is greater than the first lens position phase difference. That is, in some embodiments, FIG. 4B illustrates the processor 340 performing a check of stability upon obtaining the second lens position phase difference. The processor 340 may determine whether the scene being captured or photographed is stable in a way similar to the method 400A at 402.

If, at 418, the processor 340 determines that the scene is not stable, the processor may not proceed to method 400 at 410 for determining whether the second lens position phase difference is greater than the first lens position phase difference. As described above, the processor 340 would be uncertain whether the results were due to an autofocus oscillation condition or whether the results were due to the change in scene being photographed.

Further, if, at 418, the processor 340 determines that the scene is not stable, in some embodiments, at 414, the processor 340 may utilize phase detection autofocus for continuing to focus objects in the changing or unstable scene. The processor 340 may continue to track moving objects, for example, using phase detection autofocus.

Accordingly, the processor 340 may discard phase detection autofocus and utilize contrast detection autofocus when the processor 340 determines that lens position phase difference data is not converging and the scene is stable. If the scene were not stable, as described, the processor 340 may continue utilizing phase detection autofocus for tracking moving objects or an unstable scene. That is, if the processor 340 cannot identify an autofocus oscillation condition, the processor 340 would not switch to utilizing contrast detection autofocus.

In some embodiments, the contrast detection autofocus mechanism may achieve optimal focus slower than the phase detection autofocus mechanism. However, as discussed above, the processor 340 may switch from using the phase detection autofocus method to the contrast detection autofocus method to avoid an autofocus oscillation condition. When the scene or object being photograph changes, the scene or object being photographed may no longer have high frequency detail that intersects a focus sensor pair. It may be desirable to resume the phase detection autofocus mechanism.

Figure 6:
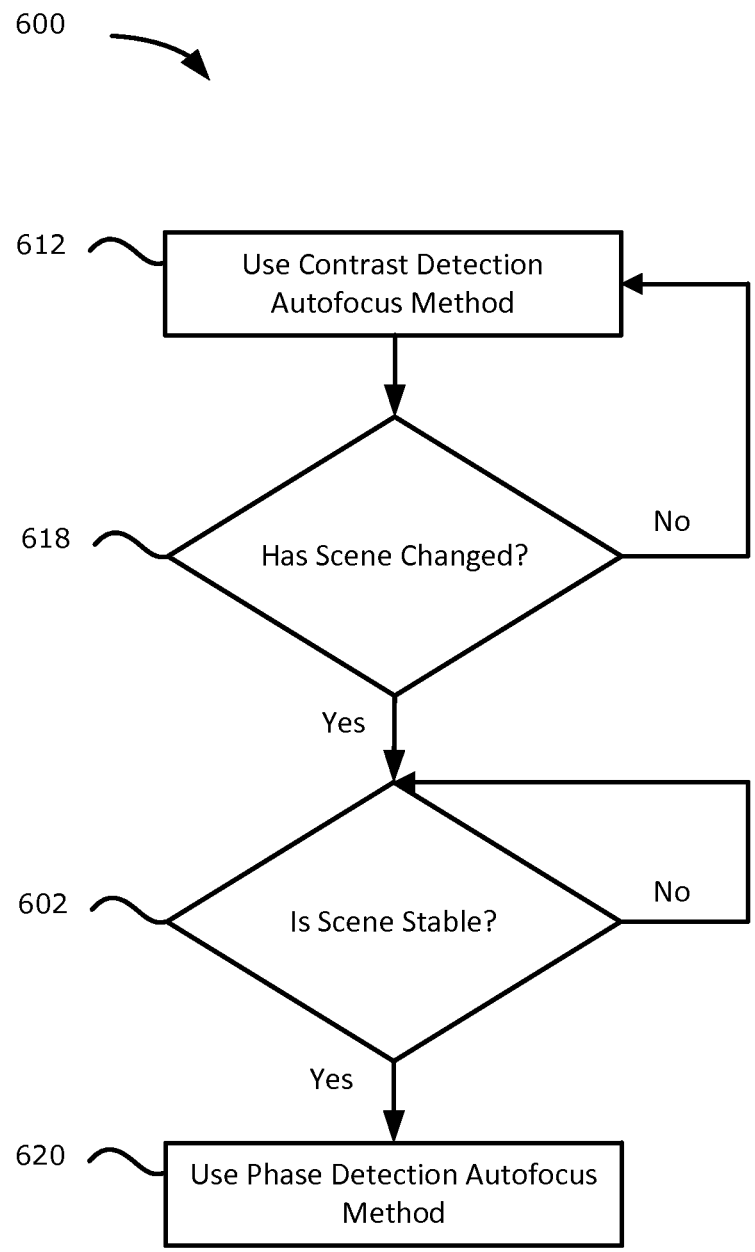
FIG. 6 is a flowchart illustrating an example method of determining an autofocus mechanism to use.

Reference will now be made to FIG. 6 which illustrates an example method 600 of determining which autofocus mechanism to employ. The method 600 may be performed by the electronic device 101 of the described above with reference to FIGS. 1 to 3 or a variation of such electronic devices. For example, in at least some embodiments, processor-executable instructions 320, such as a camera application 380, may configure a processor 340 of the electronic device 101 to perform the method 600.

At 612, the processor 340 may be utilizing the contrast detection autofocus method. For example, referring briefly again to FIG. 4A, the processor 430 may have identified, at 410, an autofocus oscillation condition and, at 412, the processor 430 may have switched to using the contrast detection autofocus method for configuring the camera lens.

At 618, the processor 340 may determine whether the image scene has changed. In some embodiments, the processor 340 may compare pixel data from a captured image at a prior point in time to a captured image at a later point in time to determine whether the pixel data has changed. In some embodiments, the processor 340 may additionally utilize data from sensors for detecting movement of the electronic device 101 to determine whether the image scene has changed. As described, sensors for detecting movement of the electronic device 101 may include gyroscopes and accelerometers. If the processor 340 determines that the image scene has not changed, the processor 340 may continue to utilize contrast detection autofocus.

If, at 618, the processor 340 determines that the image scene has changed, at 602, the processor 340 may determine whether the scene is stable. For example, the processor 340 may determine whether the scene is stable in accordance with the method as described at 402 in FIG. 4A. That is, in some embodiments, the processor 340 may determine whether the luminance data of each pixel is changing. In some embodiments, the processor 340 may determine that a scene is stable by retrieving data from sensors for detecting movement of the electronic device 101. As described, sensors for detecting movement of the electronic device 101 may include gyroscopes and accelerometers. If the processor 340 determines that the scene to be captured is not stable, the processor 340 continues to monitor for the presence of a stable scene.

When processor 340 determines that the scene to be captured is stable, at 620, the processor 340 may utilize the phase detection autofocus mechanism as described herein. For example, at 620, the processor 340 may execute the method beginning at 404 of FIG. 4A to obtain a first lens position phase difference, detect lens movement, at 406, and obtain a second lens position phase difference, at 408. That is, the processor 340 may utilize the phase detection autofocus mechanism to adjust the lens position to accurately focus the scene or object onto the camera image sensor.

In some embodiments, the processor 340 may change from using the contrast detection autofocus method to using the phase detection autofocus method upon detecting a scene change. For example, if, at 618, the processor 340 determines that the image scene has changed, the processor 340 may proceed to method 600 at 620 and utilize phase detection autofocus. That is, in some embodiments, the processor 340 may not check whether the scene is stable. Rather, if, at 618, the processor 340 determines that the image scene has changed, the processor 340, at 620, utilizes phase detection autofocus to track or focus objects in a changing scene. Continuing with the present example, the processor 340 may determine whether the scene is stable at a later time. For example, when the processor 340 is determining whether an autofocus oscillation condition is occurring or may occur, the processor 340 may then determine whether the scene is stable at 418 of method 400 in FIG. 4B.

As apparent from the description of FIGS. 4 to 6, high frequency details intersecting focus sensor pairs may lead to a phase detection autofocus oscillation condition. In some embodiments, other characteristics of a camera 108 using phase detection autofocus may also cause an autofocus oscillation condition. In particular, when the processor 340 utilizes a zero or "near zero" phase difference threshold to determine when to adjust a camera lens and when lens movements are made in discrete steps, a camera 108 may also encounter an autofocus oscillation condition. For example, the "optimal" lens position may lie somewhere between two of the discrete steps that are provided by the camera lens. When the lens is moved to the lens position that is on one side of the "optimal" position, it may determine that the image is out of focus and then attempt to move the lens to the lens position on the other side of the optimal position. Thus, since neither lens position is optimal, movement of the lens between these two positions may repeatedly occur without oscillation control.

An example method 700 is described for determining whether an autofocus oscillation condition may occur or is occurring.

Figure 7:
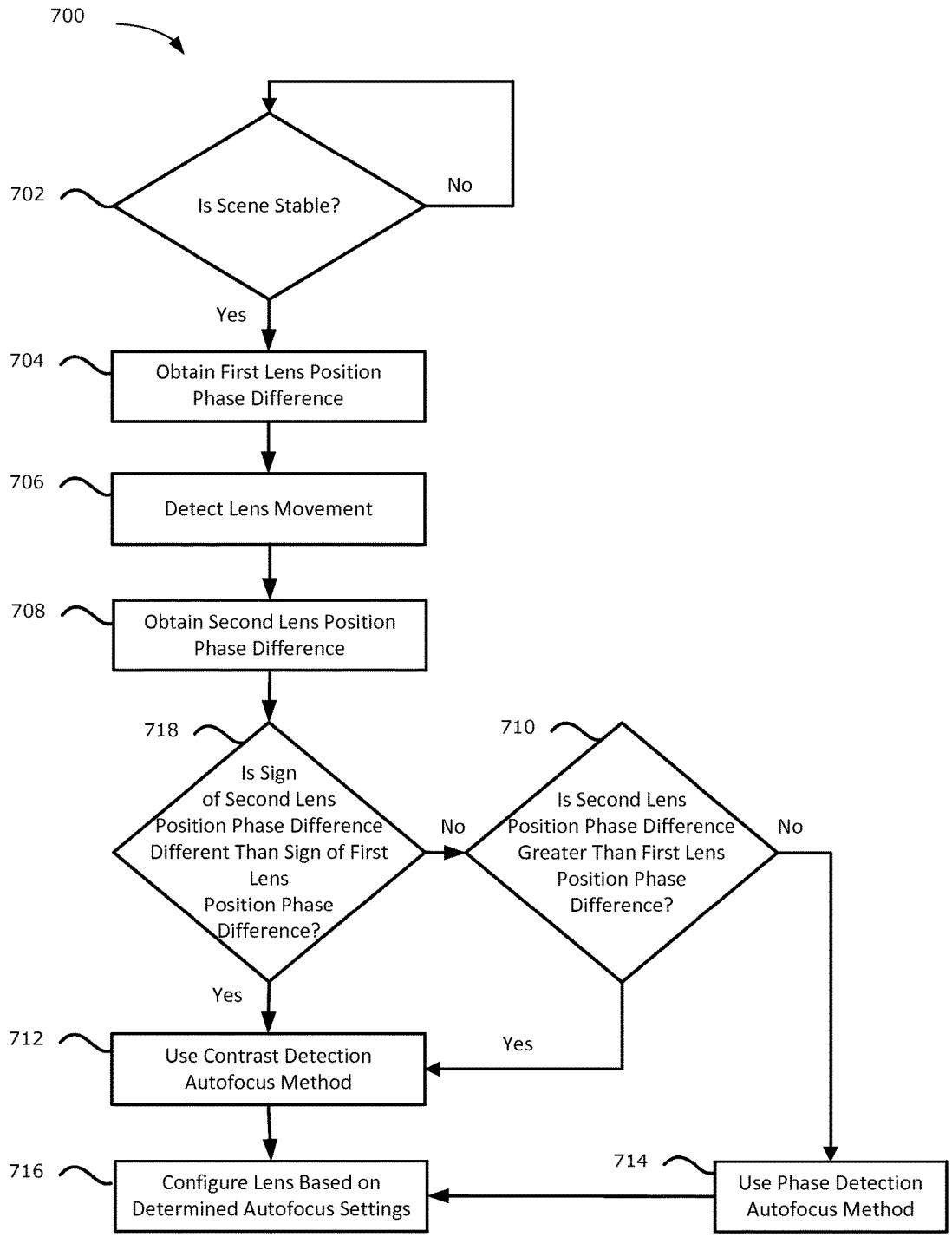
FIG. 7 is a flowchart illustrating an example method for auto-focus oscillation control in an imaging device.

Reference is now made to FIG. 7 which illustrates another example method 700 for auto-focus oscillation control in an imaging device. The method 700 may be performed by an electronic device 101 of the type described with reference to FIGS. 1 to 3 or a variation of such electronic devices. For example, in at least some embodiments, processor-executable instructions 320, such as a camera application 380, may configure a processor 340 of the electronic device 101 to perform the method 700.

The method 700 at 702, 704, 706 and 708 may correspond to and be similar to those of method 400A at 402, 404, 406 and 408, respectively. That is, the processor 340 may detect a stable scene, at 702, obtain a first lens position phase difference, at 704, detect lens movement, at 706, and obtain a second lens position phase difference, at 708, for configuring a lens to correctly focus a scene or object onto a camera image sensor.

In some embodiments of the electronic device 101, the camera 108 may have a lens that is configured or moved in discrete steps. That is, the lens may move towards or away from the camera image sensor according to pre-defined distances.

Referring again to FIG. 8B, in some embodiments, based on the signals 806, 808 (or first defocus value and second defocus value), the processor 340 may determine that the phase difference is very small and close to zero. That is, the signals 806, 808 almost overlap and the camera lens may be near the optimal focus position for focusing the scene or object onto the camera image sensor. The processor 340 may determine that the phase difference is within an acceptable threshold and determine that the lens is in an optimal position for focusing the scene or object onto the camera image sensor.

Still referring to FIG. 8B, in other embodiments, the processor 340 may determine that the phase difference is not zero and thus not within an acceptable threshold. The processor 340 may subsequently determine that the lens should further be adjusted to achieve, for example, a zero phase difference. In embodiments where lens movement towards or away from the camera image sensor may be in pre-defined or discrete steps, lens movement to the next discrete step may result in an increasing phase difference. For example, moving the lens from a lens position as illustrated in FIG. 8B to a lens position as illustrated in FIG. 8C may cause an increasing phase difference. Further, as illustrated in FIG. 8C, the direction of the phase difference between the signals 806, 808 is opposite to the phase difference between signals 806, 808 illustrated in FIG. 8A. As a result, in FIG. 8C, the processor 340 may determine a negative phase difference, or a phase difference with a sign different than the determined phase difference in the scenario in FIG. 8A.

Thus, in some embodiments, where lens movements are in discrete steps and where the processor 340 may utilize an exacting phase difference threshold (e.g., zero phase difference threshold), the processor 340 may cause the camera lens to oscillate between a near-optimal lens position and a lens position away from the near-optimal lens position.

At 718, the processor 340 may determine whether a sign of the second lens position phase difference is different than a sign of the first lens position phase difference. In at least some embodiments, the sign may be a positive sign (+) or a negative sign (−) and a positive sign indicates that movement of the lens in one direction is desirable while a negative sign indicates that movement in the opposite direction is desirable. If the processor 340 determines that the sign of the second lens position phase difference is different than the sign of the first lens position phase difference, at 712, the processor 340 may switch from using the phase detection autofocus mechanism to using a contrast detection autofocus mechanism. That is, the processor 340 may, at 718, identify a scene where an optimal lens position cannot accurately be determined by phase detection autofocus. For example, the processor 340 may not be able to cause lens movement such that a zero phase difference threshold is achieved and thus for the lens position to correctly focus the scene or object onto the camera image sensor. At 718, the processor 340 may identify that an autofocus oscillation condition may occur and may require using the contrast detection autofocus method for determining the optimal lens position.

At 716, the processor 340 may configure the lens based on the determined autofocus settings. That is, at 716, the processor 340 may configure the lens based on the determined autofocus settings of the contrast detection autofocus mechanism.

In some embodiments, the processor 340 may cause the camera lens to move towards or away from the camera sensor a distance that spans multiple discrete steps. For example, based on a determined phase difference, the processor 340 may cause the camera lens to move 3 discrete steps away from the camera sensor.

In some embodiments, the processor 340 may determine whether the sign of the second lens position phase difference is different than the sign of the first lens position phase difference after overall lens movement is completed. In some other embodiments, the processor 340 may determine whether the sign of the second lens position phase difference is different than the sign of the first lens position phase difference after each lens movement step. For example, if the processor 340 causes the camera lens to move 3 discrete steps away from the camera sensor, the processor 340 may determine, at 718, whether the sign of the second lens position phase difference is different than the sign of the first lens position phase difference after movement according to a first discrete step, after movement according to a second discrete step and after movement according to a third discrete step. Evaluating, at 718, after each lens movement step may, in some embodiments, enable the processor 340 to more efficiently identify an optimal lens position for focusing the scene or object onto the camera image sensor.

If, at 718, the processor determines that the sign of the second lens position phase difference is not different than the sign of the first lens position phase difference, the processor 340, at 710 and similar to 410 in the method 400A, determines whether the second lens position phase difference is greater than the first lens position phase difference. The method 700 at 710, 712, 714 and 716 may correspond to and are similar to those of method 400A at 410, 412, 414 and 416, respectively.

The methods 400, 700 described herein may identify autofocus oscillation conditions associated with the phase detection autofocus mechanism. In particular, if the processor 340 determines that lens movement may not be causing decreased phase difference between images captured by PDAF focus sensor pairs, the processor 340 may determine that an autofocus oscillation condition may be occurring and utilize a contrast detection autofocus mechanism. Further, in embodiments where lens movements may be made in discrete steps and where the processor 340 may be using a phase difference threshold to determine an optimal lens position, if the processor 340 determines that lens movements may be oscillating between two positions, the processor 340 may also determine that an oscillation condition may be occurring and utilize a contrast detection autofocus mechanism. In some embodiments, the processor 340 may determine that the scene or object being photographed may have changed and may revert to using a phase detection autofocus mechanism. That is, a different scene or object may eliminate the impetus causing an autofocus oscillation condition.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable storage medium including program instructions recorded thereon (which may, for example, cause a processor to perform one or more of the methods described herein), or a computer data signal carrying computer readable program instructions may direct an apparatus to facilitate the practice of the described methods. It is understood that such apparatus, articles of manufacture, and computer data signals also come within the scope of the present disclosure.

The term "computer readable storage medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile/Video Disc (DVD) or Blu-Ray™ Disc, and a solid state storage device (e.g., NAND flash or synchronous dynamic RAM (SDRAM)).

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method for auto-focus oscillation control in an imaging device,
   the imaging device including a lens, the method comprising:
   obtaining a first lens position phase difference of signals captured by a focus sensor pair when the lens is at a first lens position;
   after obtaining the first lens position phase difference, detecting lens movement, the lens movement including transitioning the lens from the first lens position to a second lens position;
   obtaining a second lens position phase difference of signals captured by the focus sensor pair when the lens is at the second lens position;
   comparing the second lens position phase difference obtained when the lens was at the second lens position to the first lens position phase difference obtained when the lens was at the first lens position to determine whether the second lens position phase difference is greater than the first lens position phase difference; and
   in response to determining, based on the signals captured by the focus sensor pair, that the second lens position phase difference is greater than the first lens position phase difference, determining autofocus settings by a contrast detection method.

2. The method of claim 1, wherein determining autofocus settings further comprises configuring the lens based on the determined autofocus settings.

3. The method of claim 2, further comprising:
when using the contrast detection method for determining autofocus settings, detecting a change in an image scene; and
in response to detecting the change in the image scene, determining autofocus settings by a phase detection method.

4. The method of claim 1, further comprising:
in response to determining that the second lens position phase difference is equal to or less than the first lens position phase difference, determining autofocus settings by a phase detection method.

5. The method of claim 1, further comprising:
detecting a stable scene and wherein comparing the second lens position phase difference to the first lens position phase difference being in response to detection of the stable scene.

6. The method of claim 5, wherein detecting the stable scene is based on at least one of gyroscope data and pixel data.

7. The method of claim 1, wherein obtaining the second lens position phase difference further comprises:
representing an image portion as a pair of defocus values including a first defocus value and a second defocus value; and
determining a phase difference between the first defocus value and the second defocus value.

8. The method of claim 1, wherein the lens movement includes transitioning the lens using discrete steps, and
in response to determining that a sign of the second lens position phase difference is different than a sign of the first lens position phase difference, determining autofocus settings by the contrast detection method.

9. The method of claim 8, wherein determining that the sign of the second lens position phase difference is different than the first lens position phase difference identifies a scene where an optimal lens position cannot accurately be determined by phase detection autofocus.

10. The method of claim 1, wherein determining that the second lens position phase difference is greater than the first lens position phase difference identifies a scene having high frequency details.

11. An electronic device comprising:
a lens;
an image sensor; and
a processor coupled to the image sensor and the lens, the processor being configured to:
obtain a first lens position phase difference of signals captured by a focus sensor pair when the lens is at a first lens position;
after obtaining the first lens position phase difference, detect lens movement, the lens movement including transition of the lens from the first lens position to a second lens position;
obtain a second lens position phase difference of signals captured by the focus sensor pair when the lens is at the second lens position;
compare the second lens position phase difference obtained when the lens was at the second lens position to the first lens position phase difference obtained when the lens was at the first lens position to determine whether the second lens position phase difference is greater than the first lens position phase difference; and
in response to determining, based on the signals captured by the focus sensor pair, that the second lens position phase difference is greater than the first lens position phase difference, determine autofocus settings by a contrast detection method.

12. The electronic device of claim 11, wherein the processor is further configured to:
configure the lens based on the determined autofocus settings.

13. The electronic device of claim 12, wherein the processor is further configured to:
when using the contrast detection method for determining autofocus settings, detect a change in an image scene; and
in response to detecting the change in the image scene, determine autofocus settings by a phase detection method.

14. The electronic device of claim 11, wherein the processor is further configured to:
in response to determining that the second lens position phase difference is equal to or less than the first lens position phase difference, determine autofocus settings by a phase detection method.

15. The electronic device of claim 11, wherein the processor is further configured to:
detect a stable scene and wherein compare the second lens position phase difference to the first lens position phase difference being in response to detection of the stable scene.

16. The electronic device of claim 15, wherein the processor is configured to detect the stable scene is based on at least one of gyroscope data and pixel data.

17. The electronic device of claim 11, wherein obtain the second lens position phase difference, the processor is further configured to:
represent an image portion as a pair of defocus values including a first defocus value and a second defocus value; and
determine a phase difference between the first defocus value and the second defocus value.

18. The electronic device of claim 11, wherein the lens movement includes transitioning the lens using discrete steps, and
in response to determining that a sign of the second lens position phase difference is different than a sign of the first lens position phase difference, the processor is further configured to determine autofocus settings by the contrast detection method.

19. The electronic device of claim 11, wherein the processor is configured to determine that the second lens position phase difference is greater than the first lens position phase difference identifies a scene having high frequency details.

20. A non-transitory computer-readable storage medium comprising processor-executable instructions which, when executed by a processor of an electronic device, causes the electronic device to:
obtain a first lens position phase difference of signals captured by a focus sensor pair when the lens is at a first lens position;
after obtaining the first lens position phase difference, detect lens movement, the lens movement including transitioning a lens from the first lens position to a second lens position;
obtain a second lens position phase difference of signals captured by the focus sensor pair when the lens is at the second lens position;

compare the second lens position phase difference obtained when the lens was at the second lens position to the first lens position phase difference obtained when the lens was at the first lens position to determine whether the second lens position phase difference is greater than the first lens position phase difference; and in response to determining, based on the signals captured by the focus sensor pair, that the second lens position phase difference is greater than the first lens position phase difference, determine autofocus settings by a contrast detection method.

\* \* \* \* \*